United States Patent
Yamana et al.

(10) Patent No.: US 10,481,010 B2
(45) Date of Patent: Nov. 19, 2019

(54) PAD-EQUIPPED THERMOCOUPLE AND METHOD FOR PRODUCING SHEATH THERMOCOUPLE USED THEREIN

(71) Applicant: OKAZAKI MANUFACTURING COMPANY, Hyogo (JP)

(72) Inventors: Masaru Yamana, Hyogo (JP); Toshiyuki Saijo, Hyogo (JP); Naoki Takata, Hyogo (JP)

(73) Assignee: OKAZAKI MANUFACTURING COMPANY, Hyogo (JP)

( * ) Notice: Subject to any disclaimer, the term of this patent is extended or adjusted under 35 U.S.C. 154(b) by 0 days.

(21) Appl. No.: 16/331,852

(22) PCT Filed: Mar. 3, 2017

(86) PCT No.: PCT/JP2017/008466
§ 371 (c)(1),
(2) Date: Mar. 8, 2019

(87) PCT Pub. No.: WO2018/047375
PCT Pub. Date: Mar. 15, 2018

(65) Prior Publication Data
US 2019/0234804 A1    Aug. 1, 2019

(30) Foreign Application Priority Data
Sep. 9, 2016   (WO) .................. PCT/JP2016/076626

(51) Int. Cl.
*G01K 1/08*  (2006.01)
*G01K 1/14*  (2006.01)
*G01K 7/12*  (2006.01)

(52) U.S. Cl.
CPC .............. *G01K 1/08* (2013.01); *G01K 1/143* (2013.01); *G01K 7/12* (2013.01)

(58) Field of Classification Search
CPC .......... G01K 1/143; G01K 7/04; G01K 13/02; G01K 1/08; G01K 7/02; G01K 1/14;
(Continued)

(56) References Cited

U.S. PATENT DOCUMENTS

| 4,043,200 A * | 8/1977 | Finney ................... G01K 1/143 165/11.1 |
| 4,164,433 A | 8/1979 | Granahan et al. |

(Continued)

FOREIGN PATENT DOCUMENTS

| JP | S49128780 | 12/1974 |
| JP | S49128780 A | 12/1974 |

(Continued)

OTHER PUBLICATIONS

International Search Report dated May 30, 2017 for PCT Appl. No. PCT/JP2017/008466.
(Continued)

*Primary Examiner* — Gail Kaplan Verbitsky
(74) *Attorney, Agent, or Firm* — Millen, White, Zelano & Branigan, P.C.; William Nixon

(57) ABSTRACT

A pad-equipped thermocouple includes a sheathed thermocouple in which a pair of thermocouple elements and an inorganic insulating powder for holding the thermocouple elements are accommodated in a sheath. An opening of the sheath is sealed by a sealing member. A pad is welded to a pipe and configured to hold the sheathed thermocouple to a surface of the pipe. A temperature measuring junction formed by the pair of thermocouple elements is exposed to a side face of the sheath in a leading end portion. The pad includes an accommodation portion accommodating the leading end portion such that the leading end portion can be inserted into and pulled out from the accommodation portion along the surface of the pipe, and the accommodation
(Continued)

portion accommodates the leading end portion in a state where the temperature measuring junction and the surface of the pipe are in contact with each other.

8 Claims, 8 Drawing Sheets

(58) Field of Classification Search
CPC .... G01K 13/00; G01K 2013/026; G01K 7/00; G01K 2205/04
USPC .................................. 374/179, 163, 147, 208
See application file for complete search history.

(56) References Cited

U.S. PATENT DOCUMENTS

| | | | | |
|---|---|---|---|---|
| 4,338,479 | A * | 7/1982 | Bauman | H01L 35/34 136/229 |
| 4,613,482 | A * | 9/1986 | Cheney | G01N 33/225 374/33 |
| 4,659,898 | A * | 4/1987 | Spiegelman | B23K 11/002 219/117.1 |
| 4,767,468 | A * | 8/1988 | Finney | G01K 1/143 136/229 |
| 4,854,729 | A * | 8/1989 | Lovato | G01K 1/143 374/141 |
| 5,141,335 | A * | 8/1992 | Wannamaker | G01K 1/143 136/232 |
| 5,172,979 | A * | 12/1992 | Barkley | G01K 1/143 374/147 |
| 5,382,093 | A | 1/1995 | Dutcher | |
| 5,711,608 | A * | 1/1998 | Finney | G01K 7/02 136/233 |
| 5,901,900 | A * | 5/1999 | Finney | G01K 7/02 228/173.5 |
| 6,158,886 | A * | 12/2000 | Dutcher | G01K 1/143 374/147 |
| 9,752,937 | B2 * | 9/2017 | Daily | G01K 1/026 |
| 2014/0161151 | A1 * | 6/2014 | Proctor | G01K 1/143 374/147 |
| 2014/0376594 | A1 * | 12/2014 | Daily | G01K 1/026 374/179 |

FOREIGN PATENT DOCUMENTS

| | | |
|---|---|---|
| JP | S49128781 | 12/1974 |
| JP | S49128781 A | 12/1974 |
| JP | S56072237 | 6/1981 |
| JP | S56072237 U | 6/1981 |
| JP | S62042038 | 3/1987 |
| JP | S62042038 U | 3/1987 |
| JP | H01145537 A | 6/1989 |
| JP | H0269732 | 5/1990 |
| JP | H0269732 U | 5/1990 |
| JP | 3108015 U | 4/2005 |
| JP | 2016156788 A | 9/2016 |

OTHER PUBLICATIONS

International Search Report dated Nov. 29, 2016 for PCT Appl. No. PCT/JP2016/076626.
English Machine Translation of JP3108015, Publication Date: Apr. 7, 2005.
English Machine Translation of JP2016156788, Publication Date: Sep. 1, 2016.
English Machine Translation of JPS49128781, Publication Date: Dec. 10, 1974.
English Machine Translation of JPS49128780, Publication Date: Dec. 10, 1974.
English Machine Translation of JPS5672237, Publication Date: Jun. 13, 1981.
English Machine Translation of JPS6242038, Publication Date: Mar. 13, 1987.
English Machine Translation of JPH0269732, Publication Date: May 28, 1990.
English Machine Translation of JPH01145537, Publication Date: Jun. 7, 1989.
English Abstract of JP3108015, Publication Date: Apr. 7, 2005.
English Abstract of JP2016156788, Publication Date: Sep. 1, 2016.
English Abstract of JPS49128781, Publication Date: Dec. 10, 1974.
English Abstract of JPS49128780, Publication Date: Dec. 10, 1974.
English Abstract of JPS5672237, Publication Date: Jun. 13, 1981.
English Abstract of JPS6242038, Publication Date: Mar. 13, 1987.
English Abstract of JPH0269732, Publication Date: May 28, 1990.
English Abstract of JPH01145537, Publication Date: Jun. 7, 1989.

* cited by examiner

US 10,481,010 B2

PAD-EQUIPPED THERMOCOUPLE AND METHOD FOR PRODUCING SHEATH THERMOCOUPLE USED THEREIN

TECHNICAL FIELD

The present invention relates to a pad-equipped thermocouple which measures the surface temperature of a measurement target object by being in contact therewith, and relates to a method for producing a sheathed thermocouple to be used therein.

BACKGROUND ART

In a case where the surface temperature of a device such as a pipe or a container is to be measured by use of a sheathed thermocouple having thermocouple elements accommodated in a metal tube with inorganic insulating powder provided therein, a pad-equipped thermocouple is used in which a metal pad to be fixed to the surface of a measurement target object such as a pipe or a container is provided at the leading end of a sheathed thermocouple. PATENT LITERATURE 1 and PATENT LITERATURE 2 below disclose such pad-equipped thermocouples.

CITATION LIST

Patent Literature

PATENT LITERATURE 1: Japanese Utility Model Registration No. 3108015
PATENT LITERATURE 2: U.S. Pat. No. 5,382,093

SUMMARY OF INVENTION

Technical Problem

According to a pad-equipped thermocouple described in PATENT LITERATURE 1 above, while the thermocouple elements are protected from the external environment, the temperature measuring junction is in direct contact with a measurement target object. Accordingly, the pad-equipped thermocouple is less likely to be influenced by the ambient air temperature, and thus, the surface temperature of the measurement target object can be accurately measured.

A pad-equipped thermocouple described in PATENT LITERATURE 2 above is configured such that a sheathed thermocouple is inserted in a guide tube welded to a metal pad, and the sheathed thermocouple can be easily attached and detached.

In general, since a thermocouple is exposed to a high temperature environment for a long period, there are cases where properties thereof are deteriorated due to aging. Such a thermocouple of which properties have been deteriorated due to aging needs to be replaced in order to maintain measurement accuracy.

However, in the pad-equipped thermocouple described in PATENT LITERATURE 1 above, the leading ends of a pair of thermocouple elements are welded so as to seal a hole formed in the surface of the metal pad, thereby providing a temperature measuring junction. In addition, this metal pad is welded and fixed to the surface of the measurement target object such that the temperature measuring junction is in contact with the surface of the measurement target object.

Therefore, when the sheathed thermocouple is deteriorated and needs to be replaced, the thermocouple elements need to be dismounted after the welded and fixed metal pad is dismounted from the measurement target object, which is troublesome.

Further, when the metal pad fixed by welding is to be dismounted from the measurement target object, there is a risk that a pipe or a container, which is the measurement target object, is thermally influenced or damaged.

This requires a test to be performed for evaluating whether there is no problem in the performance of the pipe, the container, or the like after the metal pad has been dismounted. Thus, in general and in actuality, a pad-equipped thermocouple is newly mounted without the metal pad being dismounted.

Therefore, in the case of the pad-equipped thermocouple described in PATENT LITERATURE 1 above, even when the sheathed thermocouple is deteriorated and needs to be replaced, a whole pad-equipped thermocouple needs to be newly provided at a position on a surface at which the newly-provided pad-equipped thermocouple does not interfere with the pad-equipped thermocouple that needs to be replaced.

Meanwhile, according to the pad-equipped thermocouple described in PATENT LITERATURE 2 above, since the sheathed thermocouple is easily attached and detached, the problem as in PATENT LITERATURE 1 does not occur.

However, the sheathed thermocouple of PATENT LITERATURE 2 is configured such that the sheathed thermocouple is inserted in the guide tube and performs temperature measurement in a state where the guide tube and the metal pad are interposed between the sheathed thermocouple and the measurement target object, and unlike the pad-equipped thermocouple described in PATENT LITERATURE 1 above, the temperature measuring junction is not in direct contact with the measurement target object. Therefore, the sheathed thermocouple of PATENT LITERATURE 2 is easily influenced by the ambient air temperature, and there is a risk of this causing a decrease in the measurement accuracy of the surface temperature of the measurement target object.

Thus, with conventional pad-equipped thermocouples, it is difficult to realize both of: making the pad-equipped thermocouple less likely to be influenced by the ambient air temperature, thereby accurately measuring the surface temperature of the measurement target object; and improving maintainability that the thermocouple can be easily replaced.

The present invention has been made in view of such circumstances. An object of the present invention is to provide a pad-equipped thermocouple that can perform accurate temperature measurement and that can improve maintainability, and a method for producing a sheathed thermocouple to be used therein.

Solution to Problem (1) A pad-equipped thermocouple of the present invention is a pad-equipped thermocouple including: a sheathed thermocouple in which at least a pair of thermocouple elements and an inorganic insulating powder for holding the thermocouple elements are accommodated in a sheath, and an opening in a leading end of the sheath is sealed by a sealing member being welded to the leading end of the sheath; and a pad welded to a temperature measurement target object and configured to hold the sheathed thermocouple at a surface of the temperature measurement target object, wherein a temperature measuring junction formed by the pair of thermocouple elements is provided so as to be exposed at a sheath side face of a leading end portion of the sheathed thermocouple, the pad includes an accommodation portion configured to accommodate the leading end portion of the sheathed thermocouple such that the leading end portion can be inserted into and pulled out from the accommodation portion along the surface of the temperature measurement target object, and the accommodation portion accommodates the leading end portion of the sheathed thermocouple in a state where the temperature measuring junction and the surface of the temperature measurement target object are in contact with each other.

According to the pad-equipped thermocouple configured as described above, the temperature measuring junction is provided so as to be exposed at the sheath side face of the leading end portion of the sheathed thermocouple, and the leading end portion of the sheathed thermocouple is accommodated in the accommodation portion in a state where the temperature measuring junction and the surface of the measurement target object are in contact with each other. Accordingly, the pad-equipped thermocouple is less likely to be influenced by the ambient air temperature, and thus, can accurately measure the surface temperature of the measurement target object. In addition, the leading end portion of the sheathed thermocouple is accommodated in the accommodation portion of the pad such that the leading end portion can be inserted into and pulled out from the accommodation portion. Thus, if the leading end portion is pulled out from the accommodation portion, the sheathed thermocouple can be easily dismounted from the pad.

As described above, according to the pad-equipped thermocouple having the configuration described above, the surface temperature of the measurement target object can be accurately measured, and the thermocouple can be easily replaced. Thus, maintainability can be improved.

(2) Preferably, in the pad-equipped thermocouple described above, the sheath side face of the leading end portion of the sheathed thermocouple has formed therein a hole portion for allowing the temperature measuring junction to be exposed therethrough, the hole portion is formed at a predetermined interval from an end face of the leading end, of the sheath, which has the sealing member welded thereto, the temperature measuring junction is formed as a weld portion obtained by welding leading ends of the pair of thermocouple elements to each other, and the hole portion is sealed by the weld portion.

In this case, the temperature measuring junction can be formed at a position apart from the sealing member. Therefore, when the sealing member is to be fixed to the leading end face of the sheath, influence, such as degeneration due to heat, on the temperature measuring junction can be alleviated.

(3) In the pad-equipped thermocouple described above, the sheathed thermocouple may include: a first bar-shaped portion having, at one end thereof, the leading end portion; and a second bar-shaped portion connected to an other end of the first bar-shaped portion and extending in a direction that crosses an extending direction of the first bar-shaped portion in a state where the second bar-shaped portion is in contact with the temperature measurement target object, and the second bar-shaped portion may be fixed to the surface of the temperature measurement target object by a fixing plate configured to fix the sheath.

In this case, the fixing plate can prevent the first bar-shaped portion from rotating about the axis extending along the longitudinal direction of the first bar-shaped portion. As a result, the temperature measuring junction can be caused to be reliably in contact with the surface of the measurement target object.

(4) The pad-equipped thermocouple described above may be configured such that the leading end portion has an outer peripheral shape which is a deformed shape which is not a circular shape, and the accommodation portion has an inner peripheral shape which is a shape that corresponds to the outer peripheral shape of the leading end portion, thereby preventing the leading end portion from rotating about an axis extending along a longitudinal direction. It should be noted that the inner peripheral shape of the accommodation portion means the shape of the inner periphery in a radial cross section of the accommodation portion. The outer peripheral shape of the leading end portion means the shape of the outer periphery in a radial cross section of the sheath.

(5) In the pad-equipped thermocouple described above, the inner peripheral shape of the accommodation portion and the outer peripheral shape of the leading end portion of the sheathed thermocouple may be each formed in any of a closed curve shape other than a circular shape, a semicircular shape, and a polygonal shape, and the inner peripheral shape of the accommodation portion and the outer peripheral shape of the leading end portion of the sheathed thermocouple may be made to be the same with each other so as not to cause a gap between an inner peripheral face of the accommodation portion and an outer peripheral face of the leading end portion of the sheathed thermocouple and the accommodation portion may accommodate the leading end portion so as to be fitted to each other.

In this case, the accommodation portion can prevent the leading end portion of the sheathed thermocouple from rotating about the axis extending along the longitudinal direction. As a result, the temperature measuring junction can be caused to be reliably in contact with the surface of the measurement target object.

(6) A method for producing the sheathed thermocouple to be used in the pad-equipped thermocouple according to (1) to (5) above includes: a step of removing a leading end section of a first sheath member and the inorganic insulating powder in the leading end section of the first sheath member from a sheathed thermocouple base material in which at least the pair of thermocouple elements and the inorganic insulating powder for holding the thermocouple elements are accommodated in the first sheath member, and of causing leading end portions of the pair of thermocouple elements to be exposed; a step of forming, in a side face of a second sheath member which is to be abutted and connected to the first sheath member, a hole portion which allows communication between inside and outside of the second sheath member; a step of inserting the leading end portions of the pair of thermocouple elements into the hole portion from inside of the second sheath member; a step of forming the sheath by causing an end face of the first sheath member and one end face of the second sheath member to be abutted and welded to each other, forming the temperature measuring junction exposed toward the outside of the second sheath member through the hole portion by welding, at the hole portion, the leading ends of the pair of thermocouple elements to each other, and filling the inorganic insulating powder into the second sheath member through the opening in the leading end of the sheath after sealing the hole portion by welding; and a step of sealing the opening by welding the sealing member to the opening in the leading end of the sheath.

According to the method for producing the sheathed thermocouple configured as described above, the leading end portions of the pair of thermocouple elements are caused to be exposed, and the temperature measuring junction exposed from the hole portion is formed by welding the pair of thermocouple elements to each other at the hole portion formed in the second sheath member, and then, the first sheath member and the second sheath member are welded to each other. Therefore, for example, when compared with a case where work is performed while the pair of thermocouple elements are handled within the sheath without the pair of thermocouple elements being exposed to the outside, workability at the time of forming the temperature measuring junction exposed at the side face of the sheath is good, and thus, production efficiency can be improved.

Advantageous Effects of Invention

According to the present invention, temperature measurement can be accurately performed and maintainability can be improved.

DESCRIPTION OF EMBODIMENTS

Hereinafter, preferable embodiments are described with reference to the drawings.

Figure 1:
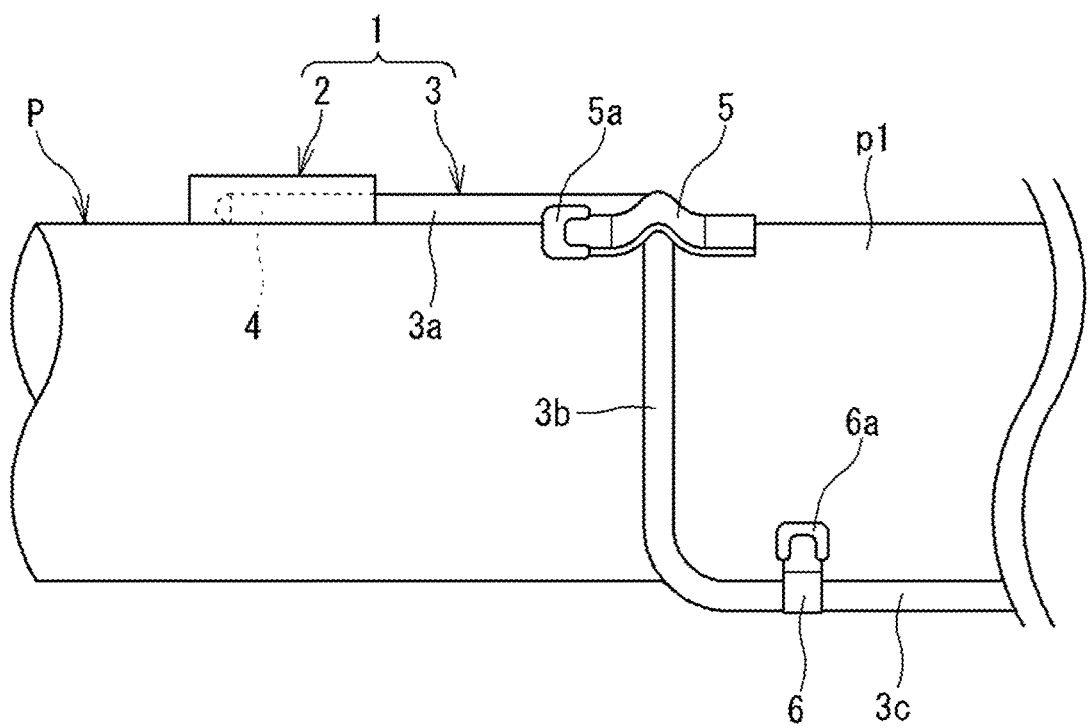
FIG. 1 is a diagram showing a pad-equipped thermocouple according to a first embodiment of the present invention.

FIG. 1 is a diagram showing a pad-equipped thermocouple according to a first embodiment of the present invention.

In FIG. 1, a pad-equipped thermocouple 1 is mounted to a cylindrical pipe P as a temperature measurement target object of which surface temperature is to be measured.

The pad-equipped thermocouple 1 includes a pad 2 and a sheathed thermocouple 3 extending from the pad 2.

The pad 2 is a member formed from a stainless steel, a heat resisting steel, or the like, and holds the sheathed thermocouple 3 at a surface p1 of the pipe P by accommodating a leading end portion 4 of the sheathed thermocouple 3 therein.

The sheathed thermocouple 3 forms a temperature sensor for measuring the surface temperature of the pipe P. The sheathed thermocouple 3 includes: a first bar-shaped portion 3a which has the leading end portion 4 at one end thereof and which extends in a bar shape in the axial direction of the pipe P along the surface p1 of the pipe P; a second bar-shaped portion 3b one end of which is connected to the other end of the first bar-shaped portion 3a and which extends, along the surface p1 of the pipe P, in a bar shape in a direction that crosses the extending direction of the first bar-shaped portion 3a; and a third bar-shaped portion 3c one end of which is connected to the other end of the second bar-shaped portion 3b and which extends, along the surface p1 of the pipe P, in a bar shape in the axial direction of the pipe P.

Each bar-shaped portion 3a, 3b, 3c is formed by bending a single bar-shaped sheathed thermocouple at a predetermined position.

Each bar-shaped portion 3a, 3b, 3c is disposed in a state of being in contact with the surface p1 of the pipe P.

The first bar-shaped portion 3a is held at the surface p1 of the pipe P by the leading end portion 4 being accommodated in the pad 2. The second bar-shaped portion 3b is held at the surface p1 of the pipe P by a first sheath fixing plate 5 welded and fixed to the surface p1. The third bar-shaped portion 3c is held at the surface p1 of the pipe P by a second sheath fixing plate 6 welded and fixed to the surface p1.

Thus, the sheathed thermocouple 3 is held at the surface p1 of the pipe P by the sheath fixing plates 5 and 6 in addition to the pad 2.

This prevents the temperature measuring junction of the sheathed thermocouple 3 from rotating about the axis and thus being displaced. Therefore, the temperature measuring junction can be caused to be reliably in contact with the surface p1 of the pipe P.

Both the sheath fixing plates 5 and 6 are plate members formed from a stainless steel or the like, respectively have one end thereof being welded and fixed to the surface p1 of the pipe P, and are formed in such shapes that respectively press the second bar-shaped portion 3b and the third bar-shaped portion 3c to the surface p1 side. Accordingly, the sheath fixing plates 5 and 6 hold the second bar-shaped portion 3b and the third bar-shaped portion 3c at the surface p1, respectively.

At one end of each of the sheath fixing plates 5 and 6, weld portions 5a and 6a are formed, respectively. The one ends of the sheath fixing plates 5 and 6 are welded and fixed to the surface p1. Meanwhile, the other ends of the sheath fixing plates 5 and 6 are not welded or fixed to the surface p1, and are in a free state. Further, the sheath fixing plates 5 and 6 have plate thicknesses that allow easy deformation thereof.

Accordingly, if external force is applied to the sheath fixing plates 5 and 6 so as to be deformed to open, thereby cancelling the holding of the second bar-shaped portion 3b and the third bar-shaped portion 3c, the sheathed thermocouple 3 can be easily dismounted from the pad 2 and the pipe P.

When the sheathed thermocouple 3 is to be mounted again, the leading end portion 4 of the first bar-shaped portion 3a is accommodated in the pad 2 so as to be in contact with the surface p1 of the pipe P, the sheath fixing plates 5 and 6 are deformed into their original states by external force so as to hold the second bar-shaped portion 3b and the third bar-shaped portion 3c, respectively. Accordingly, the sheathed thermocouple 3 that has been dismounted once can be mounted again.

Figure 2:
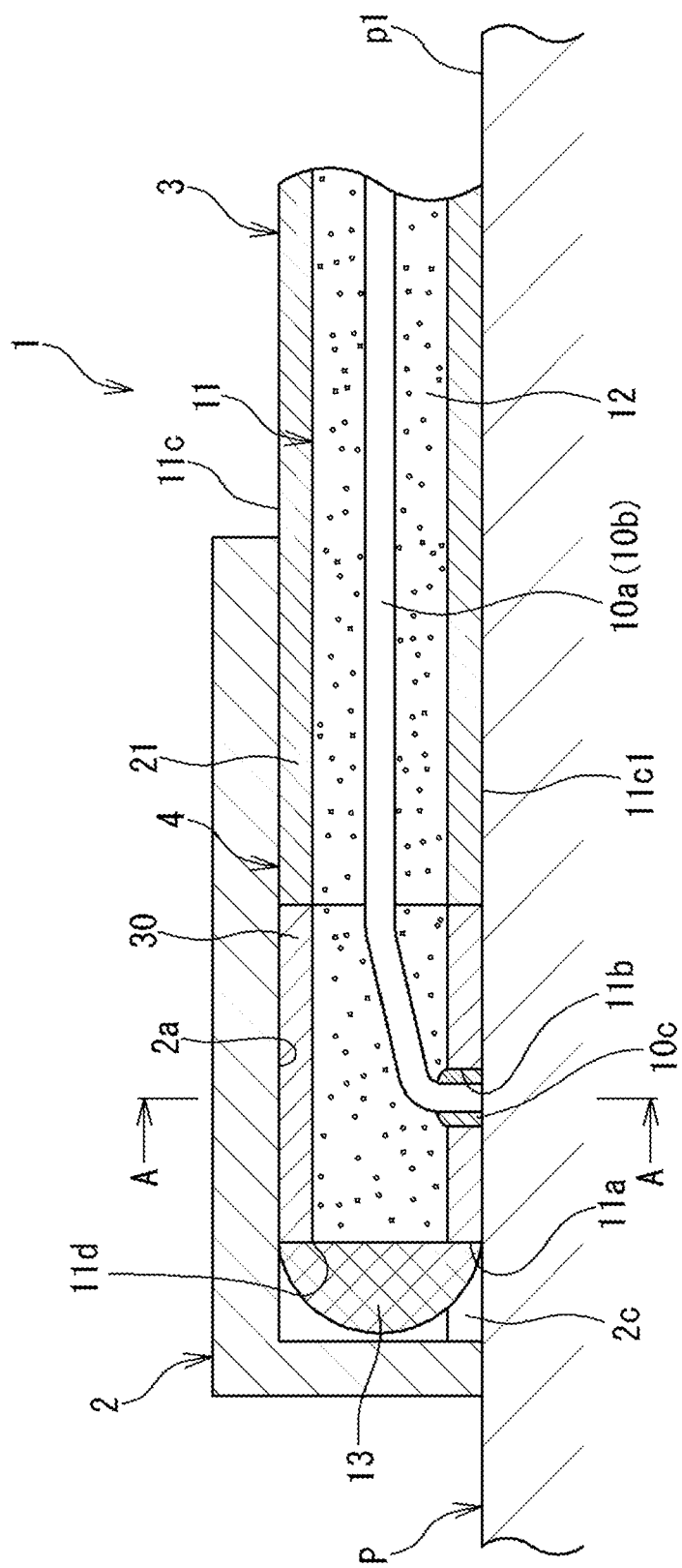
FIG. 2 is a cross-sectional view of the vicinity of a pad of the pad-equipped thermocouple.
Figure 3:
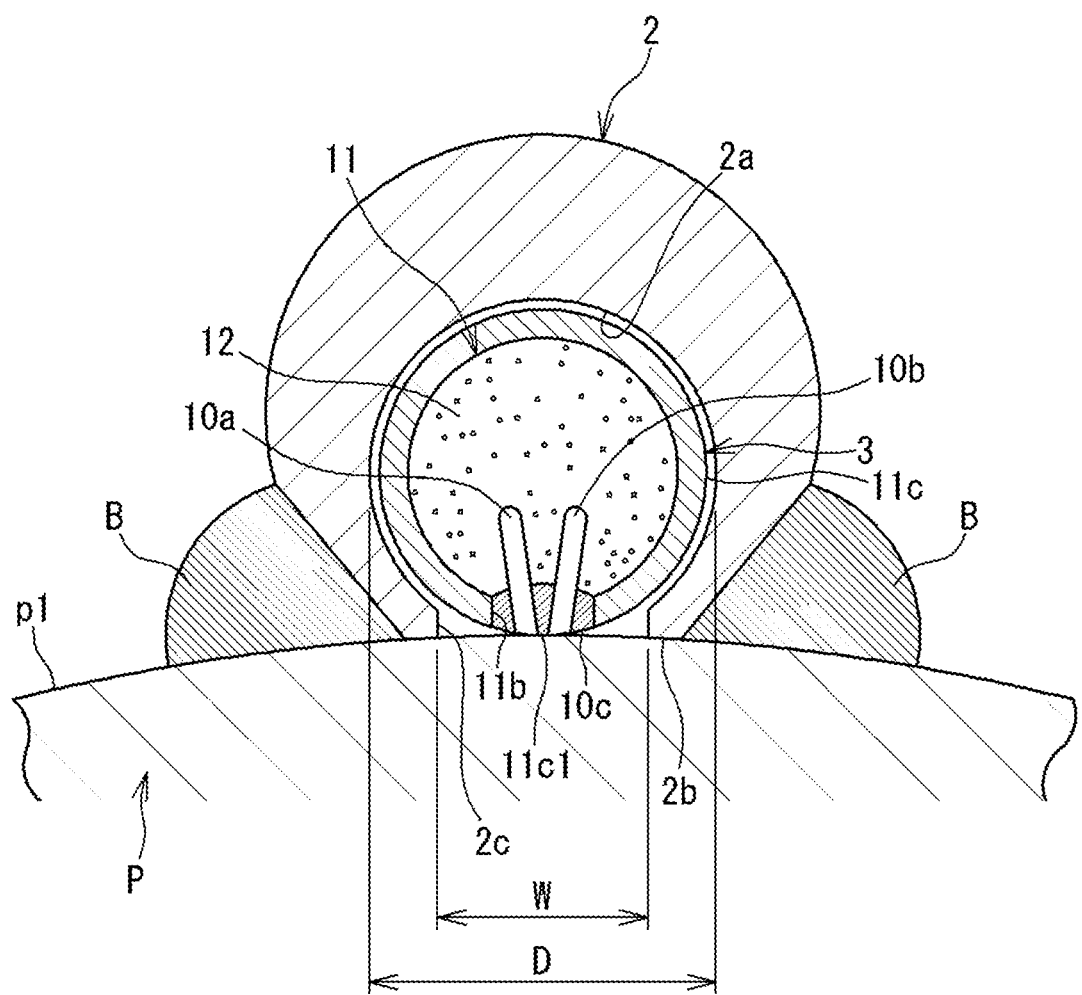
FIG. 3 is a cross-sectional view along the A-A arrows in FIG. 2.

FIG. 2 is a cross-sectional view of the vicinity of the pad 2 of the pad-equipped thermocouple 1, and FIG. 3 is a cross-sectional view along the A-A arrows in FIG. 2.

The pad 2 has formed therein an accommodation portion 2a which accommodates the leading end portion 4 of the sheathed thermocouple 3 so as to cover the leading end portion 4.

In the sheathed thermocouple 3, the leading end portion 4, which is the part thereof accommodated in the accommodation portion 2a, is in contact with the surface p1 of the pipe P in a state where the leading end portion 4 is accommodated in the accommodation portion 2a.

The sheathed thermocouple 3 includes: a pair of thermocouple elements 10a and 10b; a temperature measuring junction 10c which connects the leading ends of the pair of thermocouple elements 10a and 10b to each other; a sheath 11 which accommodates the thermocouple elements 10a and 10b; an inorganic insulating powder 12 filling the sheath 11; and a sealing member 13 which seals the opening at the leading end of the sheath 11.

The sheath 11 is a cylindrical tubular member formed from a stainless steel or a heat resisting alloy, for example, and protects the thermocouple elements 10a and 10b accommodated therein from the external environment.

The sheath 11 is formed by connecting a sheath 21 (first sheath member) and a sleeve 30 (second sheath member) having the sealing member 13 fixed thereto as described later.

As the inorganic insulating powder 12, an inorganic material powder such as magnesium oxide (MgO), aluminium oxide ($Al_2O_3$), or the like is used, for example. By filling the sheath 11, the inorganic insulating powder 12 holds the thermocouple elements 10a and 10b in the sheath 11.

As described above, the sheathed thermocouple 3 extends, having a configuration in which the thermocouple elements 10a and 10b are accommodated in the sheath 11. Thus, the second bar-shaped portion 3b and the third bar-shaped portion 3c of the sheathed thermocouple 3 also have a similar configuration.

The sealing member 13 is a disc-like member formed from a stainless steel or a heat resisting alloy, and is welded and fixed to a leading end face 11a of the sheath 11. Accordingly, the sealing member 13 seals an opening 11d of the leading end face 11a of the sheath 11 such that the inorganic insulating powder 12 in the sheath 11 does not leak to the outside.

The thermocouple elements 10a and 10b are blocked from the external atmosphere by the inorganic insulating powder 12 and the sealing member 13, and are protected from external environments such as a mechanical impact and a corrosive atmosphere. In addition, occurrence of measurement errors due to reduced insulation of the inorganic insulating powder caused by entry of moisture from outside is prevented.

A hole portion 11b is formed in a side face 11c of the sheath 11 at the leading end portion 4 of the sheathed thermocouple 3. The hole portion 11b is formed at a predetermined interval in the axial direction from the leading end face 11a having the sealing member 13 welded thereto. The hole portion 11b is formed so as to allow communication between the inside and the outside of the sheath 11. The hole portion 11b is formed in an abutment face 11c1, of the side face 11c of the sheath 11, that is in contact with the surface p1 of the pipe P.

As described above, the pair of thermocouple elements 10a and 10b are accommodated in the sheath 11 along the longitudinal direction of the sheath 11. Of the pair of thermocouple elements 10a and 10b, if, for example, one thermocouple element 10a serves as the thermocouple element at the positive side, the other thermocouple element 10b serves as the thermocouple element at the negative side.

The temperature measuring junction 10c is a member for detecting the temperature of the surface p1 of the pipe P, and is formed as a weld portion which is obtained by welding the leading ends of the pair of thermocouple elements 10a and 10b to each other. The weld portion seals the hole portion 11b, and prevents the inorganic insulating powder 12 in the sheath 11 from leaking.

As described above, the temperature measuring junction 10c is provided so as to extend, from the inner side of the sheath 11 and through the hole portion 11b, to be exposed to the outer side of the sheath 11. The hole portion 11b is formed in the abutment face 11c1 which is in contact with the surface p1 of the pipe P as described above. Therefore, the temperature measuring junction 10c is provided so as to be exposed at the abutment face 11c1.

In addition, the temperature measuring junction 10c is formed so as to be in contact with the surface p1 of the pipe P.

Thus, since the temperature measuring junction 10c is provided so as to be exposed at the abutment face 11c1 of the sheath 11 and is in contact with the surface p1 of the pipe P, the sheathed thermocouple 3 can accurately measure the surface temperature of the pipe P.

The pad 2 is a substantially cylindrical hollow member having the accommodation portion 2a formed therein, and is welded and fixed in a state where a contact face 2b is in contact with the surface p1 of the pipe P.

The pad 2 and the pipe P are welded to each other from outside along the boundary therebetween. Thus, in the boundary part between the surface of the pad 2 and the surface p1, a weld bead B is formed along the longitudinal direction of the pad 2.

The accommodation portion 2a formed in the pad 2 has a shape that corresponds to the outer peripheral shape in a radial cross section of the sheath 11 (hereinafter, referred to as outer peripheral shape), the inner peripheral shape in a radial cross section of the accommodation portion 2a (hereinafter, referred to as inner peripheral shape) is substantially circular, and the accommodation portion 2a is formed in a hole shape. The inner peripheral shape of the accommodation portion 2a and the outer peripheral shape of the sheath 11 have the same shape along the axial direction, and further, an inner diameter dimension D of the accommodation portion 2a is set to be such a dimension that provides a clearance that allows the sheath 11 to be inserted into and pulled out from the accommodation portion 2a. Thus, the accommodation portion 2a accommodates the leading end portion 4 of the sheathed thermocouple 3 such that the leading end portion 4 can be inserted into and pulled out from the accommodation portion 2a along the surface p1 of the pipe P.

At the contact face 2b side of the pad 2, an exposure opening 2c, which is open along the longitudinal direction of the sheath 11, is formed in a slit shape.

Through this exposure opening 2c, the accommodation portion 2a allows the side face 11c of the sheath 11 to be exposed to the pipe P, and the accommodation portion 2a accommodates the leading end portion 4 of the sheathed thermocouple 3 in a state where the temperature measuring junction 10c exposed from the sheath 11 and the surface p1 of the pipe P are in contact with each other.

Here, a width dimension W (FIG. 3) of the exposure opening 2c is set to a dimension smaller than the inner diameter dimension D of the accommodation portion 2a. Accordingly, for example, when compared with a case where the width dimension W of the exposure opening 2c is greater than or equal to the inner diameter dimension D, the inner peripheral shape of the accommodation portion 2a becomes a shape that corresponds to the outer peripheral shape of the sheath 11, and the accommodation portion 2a can hold the side face 11c up to a position closer to the abutment face 11c1 of the sheath 11. As a result, the accommodation portion 2a can hold the side face 11c of the sheath 11 in a greater range, and thus, can hold the sheath 11 (the sheathed thermocouple 3) more stably.

According to the pad-equipped thermocouple 1 having the configuration described above, the temperature measuring junction 10c is provided so as to be exposed at the side face 11c (the abutment face 11c1) of the leading end portion 4 of the sheathed thermocouple 3, and the leading end portion 4 of the sheathed thermocouple 3 is accommodated in the accommodation portion 2a in a state where the temperature measuring junction 10c and the surface p1 of the pipe P are in contact with each other. Accordingly, the pad-equipped thermocouple 1 is less likely to be influenced by the ambient air temperature, and thus, can accurately measure the surface temperature of the pipe P. In addition, the leading end portion 4 of the sheathed thermocouple 3 is accommodated in the accommodation portion 2a of the pad 2 such that the leading end portion 4 can be inserted into and pulled out from the accommodation portion 2a. Therefore, if the leading end portion 4 is pulled out from the accommodation portion 2a, the sheathed thermocouple 3 can be easily dismounted from the pad 2.

Further, if the first sheath fixing plate 5 and the second sheath fixing plate 6 are deformed into their original states by external force such that the second bar-shaped portion 3b and the third bar-shaped portion 3c are released from the pipe P, the sheathed thermocouple 3 can be easily dismounted from the pipe P.

As described above, according to the pad-equipped thermocouple 1 having the configuration described above, the surface temperature of the pipe P can be accurately measured, the sheathed thermocouple 3 can be easily replaced, and maintainability can be improved.

In the present embodiment, since the hole portion 11b is formed at a predetermined interval from the leading end face 11a of the sheath 11, the temperature measuring junction 10c can be formed at a position away from the sealing member 13. Therefore, when the sealing member 13 is to be welded to the leading end face 11a of the sheath 11, influence, such as degeneration due to heat, on the temperature measuring junction 10c can be alleviated.

In the present embodiment, the sheathed thermocouple 3 is configured to include: the first bar-shaped portion 3a having, at one end thereof, the leading end portion 4 of the sheathed thermocouple 3; and the second bar-shaped portion 3b which is connected to the other end of the first bar-shaped portion 3a and which extends, in a state of being in contact with the pipe P, in a direction that crosses the extending direction of the first bar-shaped portion 3a. Therefore, the second bar-shaped portion 3b can prevent the first bar-shaped portion 3a from rotating about the axis extending along the longitudinal direction of the first bar-shaped portion 3a. As a result, the temperature measuring junction 10c can be caused to be reliably in contact with the surface p1 of the pipe P.

Figure 4:
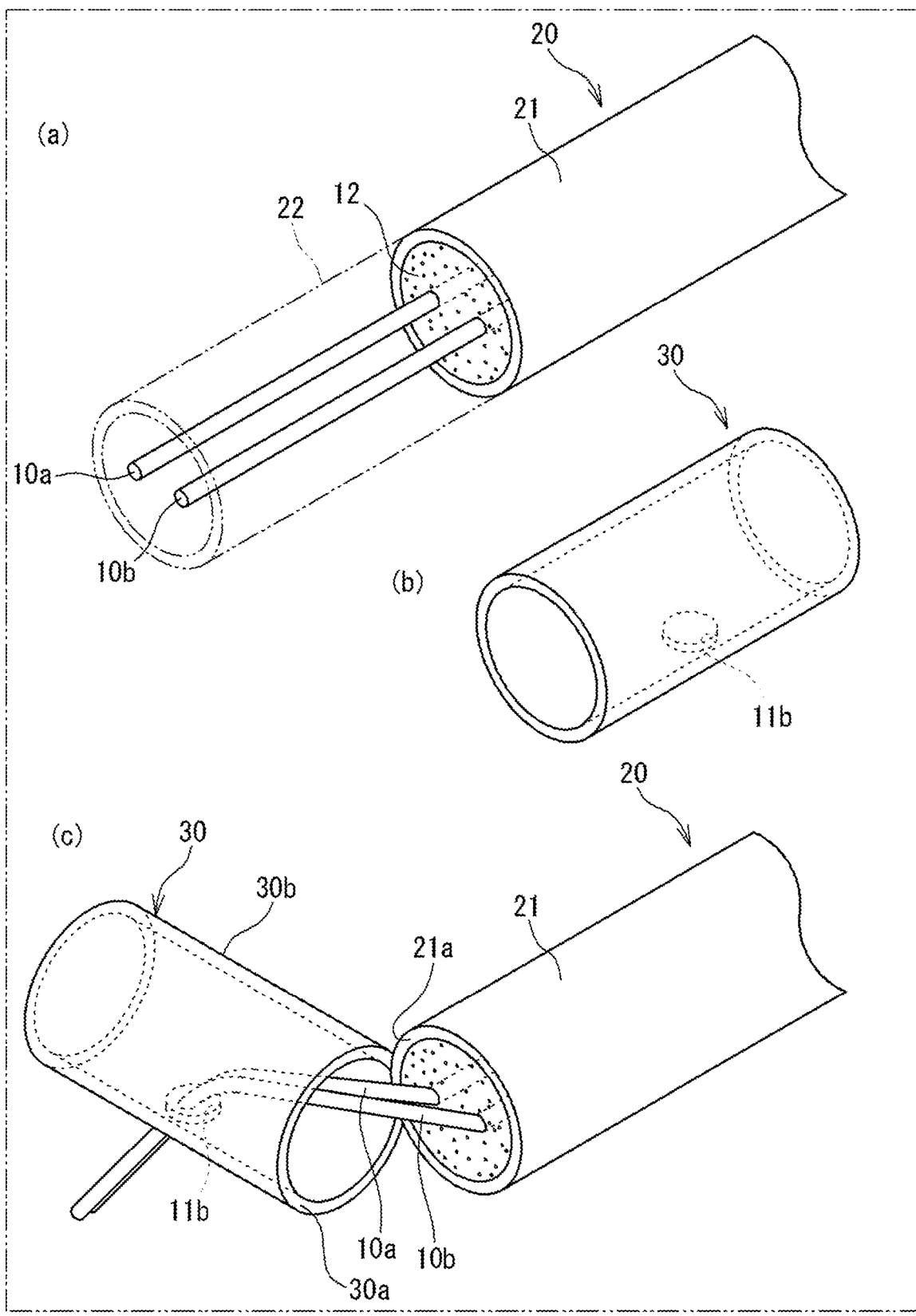
FIG. 4 is diagrams showing a method for producing a sheathed thermocouple according to the pad-equipped thermocouple of the first embodiment.
Figure 5:
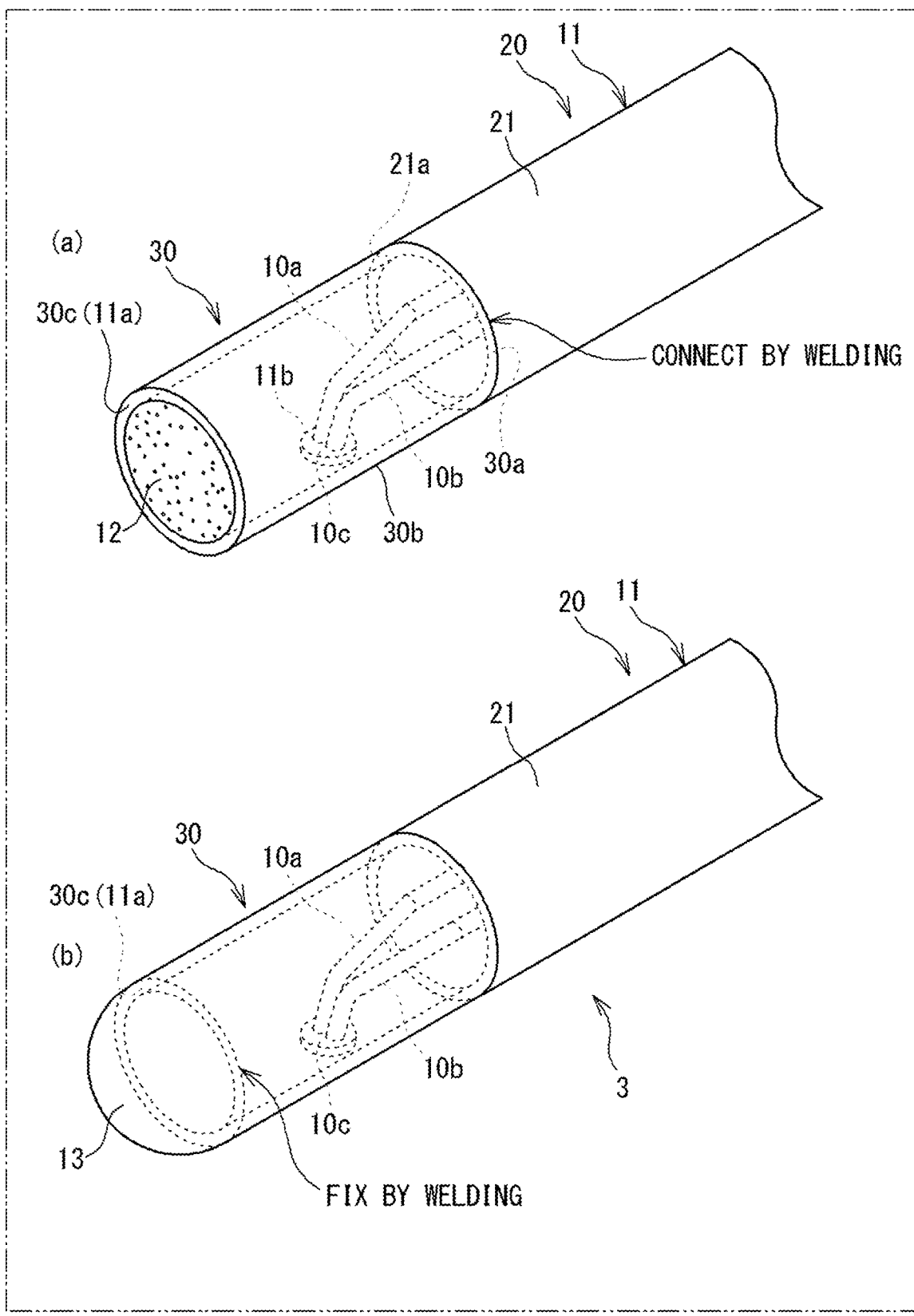
FIG. 5 is diagrams showing the method, for producing the sheathed thermocouple according to the pad-equipped thermocouple of the first embodiment, which is continued from the method shown in FIG. 4.

FIG. 4 and FIG. 5 are diagrams showing a method for producing the sheathed thermocouple 3 of the present embodiment. In FIG. 4 and FIG. 5, the sleeve 30 and the inorganic insulating powder 12 are expressed in a transparent manner so as to show the disposed state of the thermocouple elements 10a and 10b, the temperature measuring junction 10c, and the hole portion 11b in the inner space of the sleeve 30.

As described above, the sheathed thermocouple 3 is provided such that the temperature measuring junction 10c is exposed at the side face 11c (the abutment face 11c1) of the sheath 11. In order to produce such a sheathed thermocouple 3, a sheathed thermocouple not yet provided with the temperature measuring junction 10c connecting the pair of thermocouple elements 10a and 10b to each other (hereinafter, also referred to as sheathed thermocouple base material) is used.

(a) of FIG. 4 is a perspective view showing a sheathed thermocouple base material.

In (a) of FIG. 4, a sheathed thermocouple base material 20 is configured such that the pair of thermocouple elements 10a and 10b, and the inorganic insulating powder 12 for holding the thermocouple elements 10a and 10b are accommodated in the sheath 21 (first sheath member).

In order to produce the sheathed thermocouple 3 by use of the sheathed thermocouple base material 20, first, a leading end section 22 of the sheath 21, and the inorganic insulating powder 12 in the leading end section 22 are removed from the sheathed thermocouple base material 20, whereby the leading end portions of the pair of thermocouple elements 10a and 10b are exposed.

(a) of FIG. 4 indicates the leading end section 22 by broken lines, and shows a state where the leading end section 22 and the inorganic insulating powder 12 therein have been removed and the pair of thermocouple elements 10a and 10b are exposed. At this time, the sheath 21 is filled with the inorganic insulating powder 12.

Next, the hole portion 11b which allows communication between the inside and the outside of the sleeve 30 is formed in the side face of the sleeve 30 (second sheath member) that is to be abutted and connected to the sheath 21.

(b) of FIG. 4 is a perspective view showing the sleeve 30. The sleeve 30 is a cylindrical member that is configured to have substantially the same outer diameter and inner diameter as the sheath 21.

The sleeve 30 is abutted and connected to the sheath 21, thereby forming the sheath 11, together with the sheath 21.

As shown in (c) of FIG. 4, before the sleeve 30 and the sheath 21 are connected to each other, one end face 21a of the sheath 21 and one end face 30a of the sleeve 30 are brought close to each other, and the leading end portions of the pair of thermocouple elements 10a and 10b are inserted into the hole portion 11b from inside of the sleeve 30.

Then, as shown in (a) of FIG. 5, the one end face 21a of the sheath 21 after the leading end section 22 has been removed and the one end face 30a of the sleeve 30 are abutted to each other, and the entire periphery thereof is welded, whereby the sheath 21 and the sleeve 30 are connected to each other. As a result, the sheath 11 can be obtained.

Next, the leading ends of the pair of thermocouple elements 10a and 10b inserted in the hole portion 11b are welded to each other to form a weld portion, and the temperature measuring junction 10c is formed as this weld portion. In addition, the hole portion 11b is sealed by this weld portion.

The temperature measuring junction 10c is formed so as to be exposed at a side face 30b of the sleeve 30. In addition, the temperature measuring junction 10c is formed in a shape in which the portions, of the leading ends of the pair of thermocouple elements 10a and 10b, that protrude from the side face 30b of the sleeve 30, and excess weld metal of the welding are cut off, and which allows the temperature measuring junction 10c to come into contact with the surface p1 of the pipe P when the obtained sheathed thermocouple 3 is accommodated in the pad 2.

Further, the inorganic insulating powder 12 is filled into the sleeve 30 from the other end face 30c of the sleeve 30.

The other end face 30c of the sleeve 30 serves as the leading end face 11a of the sheath 11.

Next, as shown in (b) of FIG. 5, the sealing member 13 for sealing the other end face 30c of the sleeve 30 is welded to the other end face 30c over the entire periphery thereof, whereby the sealing member 13 is fixed to the sleeve 30 (the sheath 11).

In this manner, the sheathed thermocouple 3 in which the temperature measuring junction 10c is provided so as to be exposed at the side face 11c of the sheath 11 can be produced.

According to the method for producing the sheathed thermocouple 3 as configured above, the leading end portions of the pair of thermocouple elements 10a and 10b are caused to be exposed, the pair of thermocouple elements 10a and 10b are inserted from inside of the sleeve 30 into the hole portion 11b formed in the sleeve 30 (second sheath member), and then, the sheath 21 (first sheath member) and the sleeve 30 are welded to each other. Then, the leading ends of the pair of thermocouple elements 10a and 10b are welded so as to seal the hole portion 11b of the sleeve 30, whereby the temperature measuring junction is formed. Therefore, for example, when compared with a case where work is performed while the pair of thermocouple elements 10a and 10b are handled within the sheath 11 without the pair of thermocouple elements 10a and 10b being exposed to the outside, workability at the time of forming the temperature measuring junction 10c exposed at the side face 11c of the sheath 11 is good, and thus, production efficiency can be improved.

Figure 6:
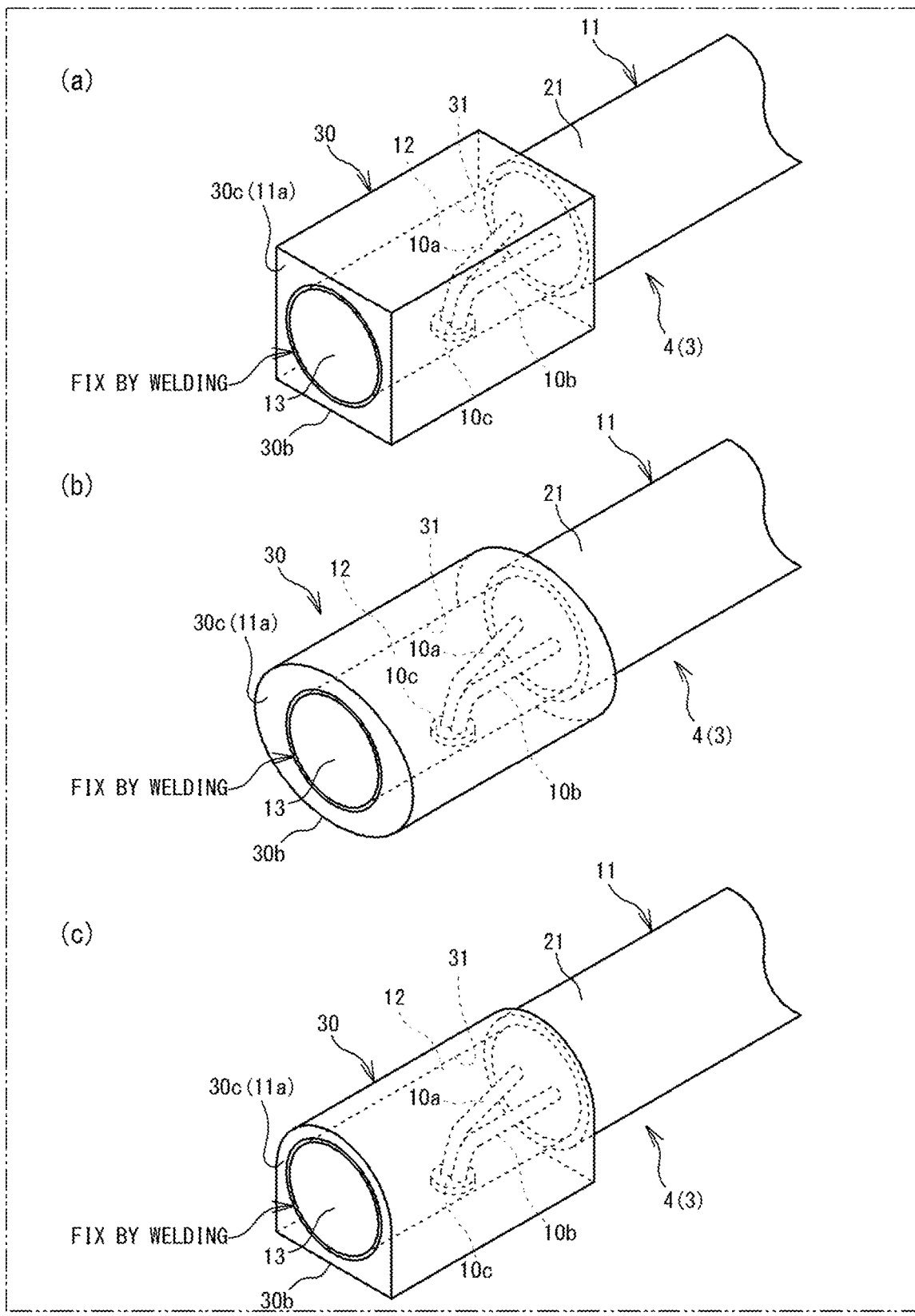
FIG. 6 is a perspective view showing a leading end portion 4 of a sheathed thermocouple 3 of a pad-equipped thermocouple according to a second embodiment.

FIG. 6 is a perspective view showing a leading end portion 4 of a sheathed thermocouple 3 of a pad-equipped thermocouple according to a second embodiment.

(a) of FIG. 6 is a perspective view showing the leading end portion 4 of the sheathed thermocouple 3 of a pad-equipped thermocouple according to a second embodiment, (b) of FIG. 6 is a perspective view showing the leading end portion 4 of the sheathed thermocouple 3 of a pad-equipped thermocouple according to a first modification of the second embodiment, and (c) of FIG. 6 is a perspective view showing the leading end portion 4 of the sheathed thermocouple 3 of a pad-equipped thermocouple according to a second modification of the second embodiment.

Figure 7:
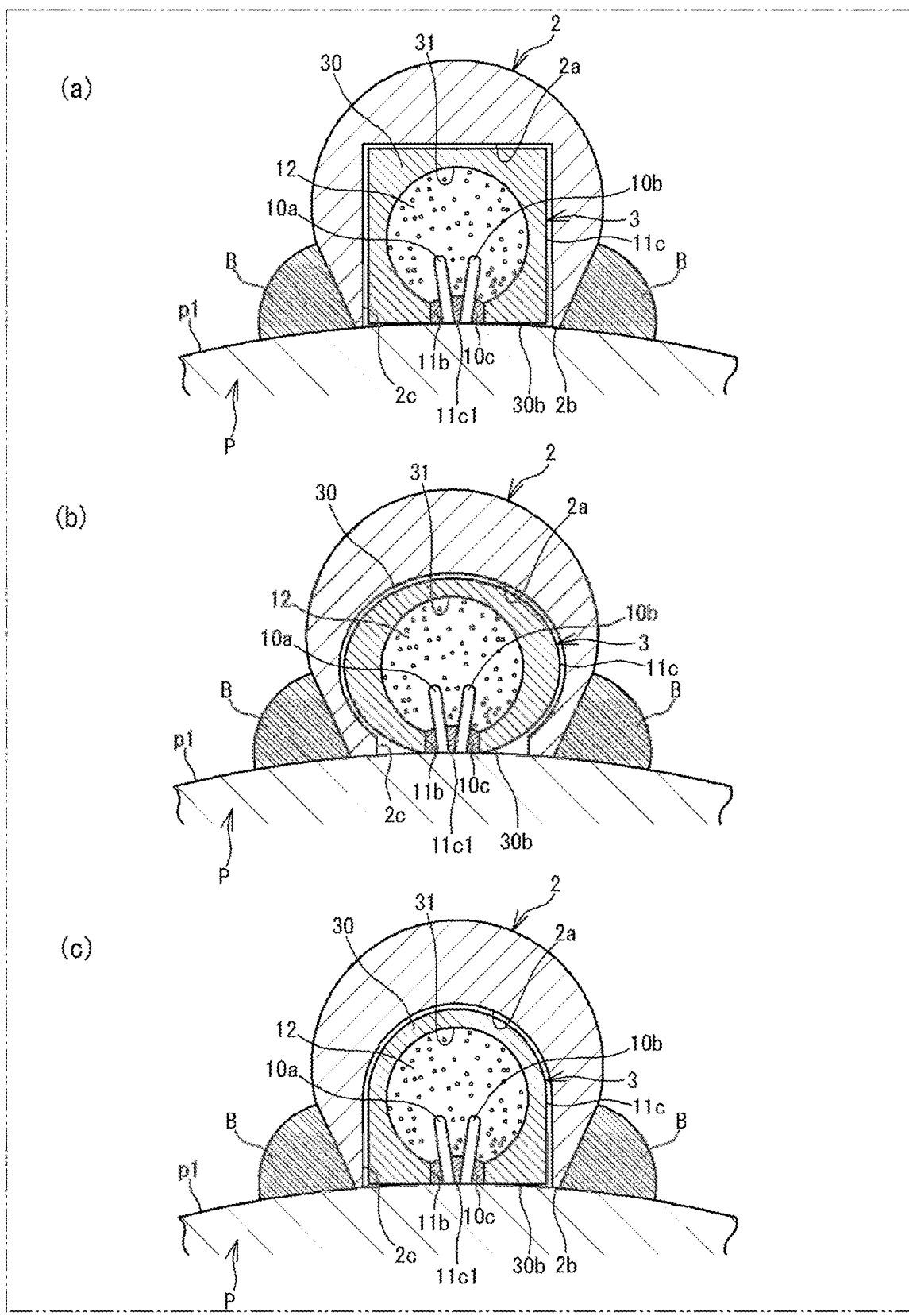
FIG. 7 is a cross-sectional view of the part in FIG. 6, that corresponds to the part along the A-A arrows in FIG. 2.

FIG. 7 is a cross-sectional view of the part in FIG. 6, that corresponds to the part along the A-A arrows in FIG. 2.

(a) of FIG. 7 is a cross-sectional view of the part, in (a) of FIG. 6, that corresponds to the part along the A-A arrows in FIG. 2, (b) of FIG. 7 is a cross-sectional view of the part, in (b) of FIG. 6, that corresponds to the part along the A-A arrows in FIG. 2, and (c) of FIG. 7 is a cross-sectional view of the part, in (c) of FIG. 6, that corresponds to the part along the A-A arrows in FIG. 2.

A pad-equipped thermocouple 1 of the second embodiment is different from that of the first embodiment in that: the outer peripheral shape of the sleeve 30 forming the leading end portion 4 of the sheathed thermocouple 3 is a deformed shape which is not a circular shape; and the inner peripheral shape of the accommodation portion 2a is a deformed shape corresponding to the sleeve 30.

As shown in (a) of FIG. 6, the outer peripheral shape of the sleeve 30 of the second embodiment is a substantially square shape.

The sleeve 30 has formed therein a through-hole 31 which penetrates the sleeve 30 along the longitudinal direction. The inner diameter of the through-hole 31 is substantially the same as the inner diameter of the sheath 21.

The hole portion 11b closed by the temperature measuring junction 10c is formed in the side face 30b which is in contact with the surface p1 of the pipe P.

The sleeve 30 is abutted and connected to the sheath 21 such that the through-hole 31 and the inner peripheral face of the sheath 21 are connected to each other. Accordingly, the sleeve 30 and the sheath 21 form the sheath 11 in which: the respective inner spaces of the sleeve 30 and the sheath 21 are connected to each other; and the resultant inner space is filled with the inorganic insulating powder 12.

That is, the sheathed thermocouple 3 of the second embodiment is produced by: making the outer peripheral shape of the sleeve 30, which forms the leading end portion 4 of the sheathed thermocouple 3, into a deformed shape (square shape) which is not a circular shape; welding the sleeve 30 and the sheath 21 which has a circular shape to each other to form the sheath 11; and forming the temperature measuring junction 10c exposed from the hole portion 11b to the sheath surface.

As shown in (a) of FIG. 7, the accommodation portion 2a of the pad 2 of the second embodiment is formed in a shape of a recessed groove in a cross section, the recessed groove extending along the longitudinal direction of the sheath 11. The accommodation portion 2a having the groove shape is formed so as to be recessed from the contact face 2b.

The pad 2 is welded and fixed in a state where the contact face 2b is in contact with the surface p1 of the pipe P. Accordingly, the accommodation portion 2a is closed at the contact face 2b side by the surface p1 of the pipe P, and is in a hole shape having a substantially square inner peripheral shape. Accordingly, the inner peripheral shape of the accommodation portion 2a is a shape that corresponds to the outer peripheral shape of the sleeve 30 forming the leading end portion 4 of the sheathed thermocouple 3.

Between the inner peripheral face of the accommodation portion 2a and the outer peripheral face of the sleeve 30 in the leading end portion 4, a clearance is provided that allows the sheathed thermocouple 3 to be inserted into and pulled out from the accommodation portion 2a along the surface p1 of the pipe P. Thus, while holding the sheathed thermocouple 3, the accommodation portion 2a prevents the leading end portion 4 of the sheathed thermocouple 3 from rotating about the axis extending along the longitudinal direction.

Since the accommodation portion 2a of the second embodiment is formed in a groove shape, the accommodation portion 2a holds the sleeve 30 in a state where the side face 30b of the sleeve 30 is exposed from the exposure opening 2c to the surface p1 of the pipe P, and the temperature measuring junction 10c is in contact with the surface p1 of the pipe P.

In the second embodiment, the outer peripheral shape of the sleeve 30 forming the leading end portion 4 of the sheathed thermocouple 3 is a square shape, and the inner peripheral shape of the accommodation portion 2a is a square shape corresponding to the sleeve 30, as a shape that can prevent the leading end portion 4 from rotating about the axis extending along the longitudinal direction. Therefore, the temperature measuring junction 10c can be caused to be reliably in contact with the surface p1 of the pipe P. As a result, the surface temperature of the pipe P can be more accurately measured.

In the second embodiment, when the sheathed thermocouple 3 is to be produced, the sheath 21 having a circular shape and the sleeve 30 having a square shape which prevents rotation of the sheathed thermocouple 3 when the sheathed thermocouple 3 is accommodated in the accommodation portion 2a are welded to each other to form the sheath 11. Therefore, it is possible to reduce the man-hour of work that is necessary for installing the sheathed thermocouple 3 such that the sheathed thermocouple 3 is in contact with the surface p1 of the pipe P and is prevented from rotating about the axis extending along the longitudinal direction.

Although the outer peripheral shape of the sleeve 30 of the second embodiment is a substantially square shape, the side face 30b facing the surface p1 side of the pipe P may be formed as a curved surface that is slightly recessed so as to correspond to the surface p1 of the pipe P.

Accordingly, substantially the entirety of the side face 30b of the sleeve 30 can be caused to be in contact with the surface p1 of the pipe P, and the temperature measuring junction 10c can be caused to be more reliably in contact with the surface p1 of the pipe P.

In the second embodiment, a case where the outer peripheral shape of the sleeve 30 is formed in a substantially square shape has been shown as an example. However, as shown in (b) of FIG. 6 and (b) of FIG. 7, the outer peripheral shape of the sleeve 30 may be an elliptical shape. Also in this first modification, if the inner peripheral shape of the accommodation portion 2a is made to be a shape that corresponds to the outer peripheral shape of the sleeve 30, the leading end portion 4 can be prevented from rotating about the axis extending along the longitudinal direction.

As shown in (c) of FIG. 6 and (c) of FIG. 7, the outer peripheral shape of the sleeve 30 may be a shape obtained by combining a semicircle and a rectangle. Also in this second modification, if the inner peripheral shape of the accommodation portion 2a is made to be a shape that corresponds to the outer peripheral shape of the sleeve 30, the leading end portion 4 can be prevented from rotating about the axis extending along the longitudinal direction.

In this modification, similarly to the second embodiment, the side face 30b of the sleeve 30 is formed in a planar shape, but may be formed as a curved surface that is slightly recessed so as to correspond to the surface p1 of the pipe P. Accordingly, the temperature measuring junction 10c can be caused to be more reliably in contact with the surface p1 of the pipe P.

The outer peripheral shape of the sleeve 30 and the inner peripheral shape of the accommodation portion 2a corresponding thereto may be any deformed shape that is not a circular shape, and may be a closed curve shape other than a circular shape such as an ellipse, a shape obtained by cutting off a part of a circular shape, a polygonal shape such as a triangle or a pentagon, a protruding type, a recessed type, and a shape obtained by combining these. Further, a shape having a protruding portion or a recessed portion which prevents rotation may be employed.

In the second embodiment described above, a case has been shown as an example in which the outer peripheral shape of the sleeve 30 is made to be a deformed shape whereby a part of the leading end portion 4 of the sheathed thermocouple 3 is made to have a deformed shape. However, the entirety of the leading end portion 4 may have a deformed shape, or the entirety, in the longitudinal direction, of the sheathed thermocouple 3 may have a deformed shape.

In the first embodiment described above, the sleeve 30 and the sheath 21 forming the leading end portion of the sheathed thermocouple 3 are cylindrical members having the same outer diameter and inner diameter with each other. However, a configuration in which the outer peripheral shape of the sleeve 30 is a polygonal shape as shown in (a) of FIG. 6, and the inner peripheral shape of the accommodation portion 2a of the pad 2 is a polygonal shape that corresponds to the outer peripheral shape of the sleeve 30 as shown in (a) of FIG. 7, (the second embodiment); a configuration in which the outer peripheral shape of the sleeve 30 is an elliptical shape as shown in (b) of FIG. 6, and the inner peripheral shape of the accommodation portion 2a of the pad 2 is an elliptical shape that corresponds to the outer peripheral shape of the sleeve 30 as shown in (b) of FIG. 7 (the first modification of the second embodiment); or a configuration in which the outer peripheral shape of the sleeve 30 is a semicircular shape as shown in (c) of FIG. 6 and the inner peripheral shape of the accommodation portion 2a of the pad 2 is a semicircular shape that corresponds to the outer peripheral shape of the sleeve 30 as shown in (c) of FIG. 7 (the second modification of the second embodiment) may be employed. In this manner, the sheathed thermocouple 3 accommodated in the accommodation portion 2a of the pad 2 can be prevented from rotating about the axis extending along the longitudinal direction of the sleeve 30, and the temperature measuring junction 10c can be caused to be reliably in contact with the surface p1 of the pipe P. The outer peripheral shape of the pad 2 is not limited to a substantially fan shape, and may be a polygonal shape or a semicircular shape. In addition, a heat insulating member may be provided at the outside of the pad 2, whereby entry of heat from outside may be restricted.

In the embodiments described above, a method has been shown in which the sealing member 13 having a substantially hemispherical shape for sealing the other end face 30c of the sleeve 30 having a cylindrical shape is welded to the other end face 30c for the entire periphery thereof, whereby the sealing member 13 is fixed to the sleeve 30. However, as the sealing member 13, the sealing member 13, as shown in (a), (b), and (c) of FIG. 6, that has a disc-like shape that closes the opening of the other end face 30c of the sleeve 30 may be employed and the sealing member 13 may fixed by welding, for the entire outer periphery thereof, to the sleeve 30. Further, the other end face 30c may be sealed by a melted welding rod.

In FIG. 6, the sleeve 30 and the inorganic insulating powder 12 are expressed in a transparent manner so as to show the disposed state of the thermocouple elements 10a and 10b, and the temperature measuring junction 10c in the inner space of the sleeve 30.

The present invention is not limited to the first embodiment and the second embodiment.

Figure 8:
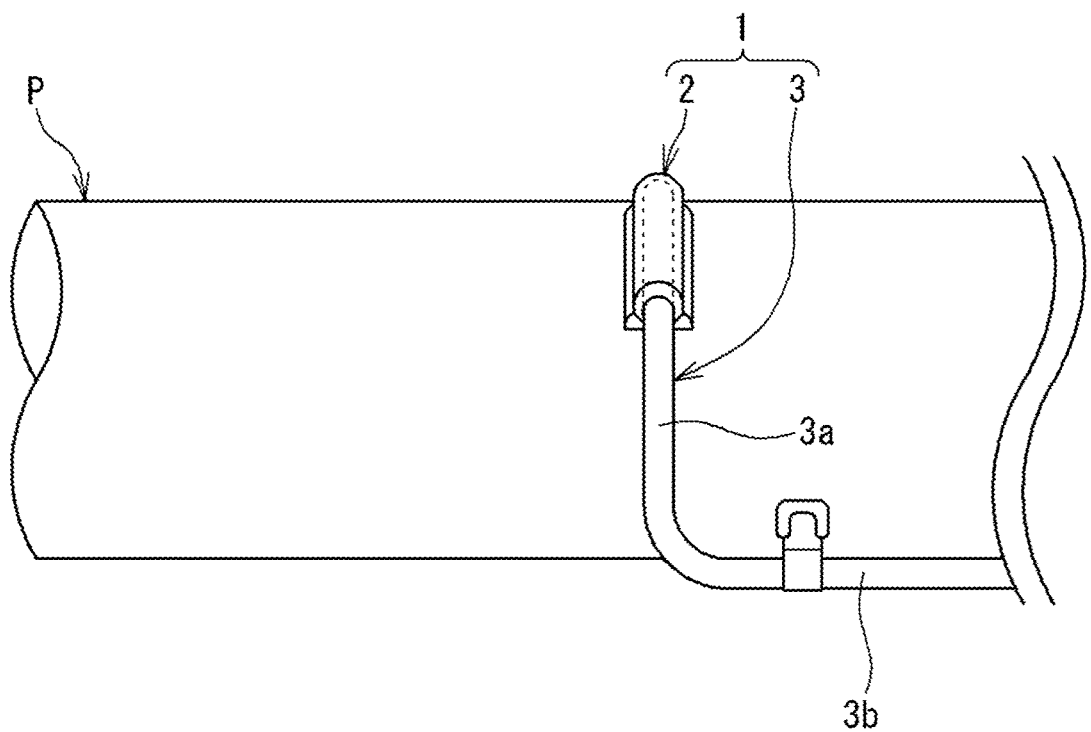
FIG. 8 is a diagram showing a variation of arrangement of the pad-equipped thermocouple.

For example, in the first embodiment, a case has been shown as an example in which the first bar-shaped portion 3a including the leading end portion 4 of the sheathed thermocouple 3 extends in a bar shape along the axial direction of the pipe P, and the pad 2 has a shape extending along the axial direction of the pipe P so as to correspond to the leading end portion 4. However, for example, as shown in FIG. 8, the first bar-shaped portion 3a may have a shape extending in a bar shape along the circumferential direction of the pipe P and the pad 2 may also have a shape extending along the circumferential direction of the pipe P so as to correspond to the first bar-shaped portion 3a.

In the embodiments described above, a case has been shown as an example in which a pair of thermocouple elements 10a and 10b are accommodated in the sheathed thermocouple 3. However, a plurality of pairs of thermocouple elements may be accommodated in the sheathed thermocouple 3.

In the embodiments described above, a case has been shown as an example in which the pad-equipped thermocouple 1 is mounted to the surface p1 of the cylindrical pipe P as a temperature measurement target object. However, the pad-equipped thermocouple 1 can be mounted to a spherical surface part of a spherical structure, and also can be mounted to a planar part of a box-shaped structure.

REFERENCE SIGNS LIST 1 pad-equipped thermocouple
2 pad
2a accommodation portion
2b contact face
2c exposure opening
3 sheathed thermocouple
3a first bar-shaped portion
3b second bar-shaped portion
3c third bar-shaped portion
4 leading end portion
5 first sheath fixing plate
5a weld portion
6 second sheath fixing plate
6a weld portion
10a thermocouple element at positive side
10b thermocouple element at negative side
10c temperature measuring junction
11 sheath
11a leading end face
11b hole portion
11c side face
11c1 abutment face
11d opening
12 inorganic insulating powder
13 sealing member
20 sheathed thermocouple base material
21 sheath
21a one end face
22 leading end section
30 sleeve
30a one end face
30b side face
30c other end face
31 through-hole
B weld bead
P pipe
p1 surface

The invention claimed is:

1. A pad-equipped thermocouple comprising:
a sheathed thermocouple in which at least a pair of thermocouple elements and an insulating powder for holding the thermocouple elements are accommodated in a sheath, and an opening in a leading end of the sheath is sealed by a sealing member being welded to the leading end of the sheath; and
a pad welded to a temperature measurement target object and configured to hold the sheathed thermocouple at a surface of the temperature measurement target object, wherein
a temperature measuring junction formed by the pair of thermocouple elements is provided so as to be exposed at a sheath side face of a leading end portion of the sheathed thermocouple,
the pad includes an accommodation portion configured to accommodate the leading end portion of the sheathed thermocouple such that the leading end portion can be inserted into and pulled out from the accommodation portion along the surface of the temperature measurement target object, and
the accommodation portion accommodates the leading end portion of the sheathed thermocouple in a state where the temperature measuring junction and the surface of the temperature measurement target object are in contact with each other, wherein
the sheathed thermocouple includes:
a first bar-shaped portion having, at one end thereof, the leading end portion; and
a second bar-shaped portion connected to an other end of the first bar-shaped portion and extending in a direction that crosses an extending direction of the first bar-shaped portion in a state where the second bar-shaped portion is in contact with the temperature measurement target object, and
the pad-equipped thermocouple further comprises
a fixing plate configured to fix the second bar-shaped portion to the surface of the temperature measurement target object, thereby preventing the first bar-shaped portion from rotating about an axis extending along a longitudinal direction, wherein
the sheath side face of the leading end portion of the sheathed thermocouple has formed therein a hole portion for allowing the temperature measuring junction to be exposed therethrough,
the hole portion is formed at a predetermined interval from an end face of the leading end, of the sheath, which has the sealing member welded thereto,
the temperature measuring junction is formed as a weld portion obtained by welding leading ends of the pair of thermocouple elements to each other, and
the hole portion is sealed by the weld portion.

2. The pad-equipped thermocouple according to claim 1, wherein the accommodation portion has an inner peripheral shape which is a shape that corresponds to an outer peripheral shape of the leading end portion, thereby preventing the leading end portion from rotating about an axis extending along a longitudinal direction.

3. The pad-equipped thermocouple according to claim 1, wherein an end of the fixing plate includes a weld portion.

4. The pad-equipped thermocouple according to claim 1, wherein the leading end portion includes a sheath member having the temperature measuring junction and the hole portion.

5. The pad-equipped thermocouple according to claim 4, wherein the pair of thermocouple elements are configured to be directed to the temperature measuring junction within the sheath member.

6. A pad-equipped thermocouple comprising:
a sheathed thermocouple in which at least a pair of thermocouple elements and an insulating powder for holding the thermocouple elements are accommodated in a sheath, and an opening in a leading end of the sheath is sealed by a sealing member being welded to the leading end of the sheath; and
a pad welded to a temperature measurement target object and configured to hold the sheathed thermocouple at a surface of the temperature measurement target object, wherein
a temperature measuring junction formed by the pair of thermocouple elements is provided so as to be exposed at a sheath side face of a leading end portion of the sheathed thermocouple,
the pad includes an accommodation portion configured to accommodate the leading end portion of the sheathed thermocouple such that the leading end portion can be inserted into and pulled out from the accommodation portion along the surface of the temperature measurement target object, the accommodation portion accommodates the leading end portion of the sheathed thermocouple in a state where the temperature measuring junction and the surface of the temperature measurement target object are in contact with each other, the leading end portion has an outer peripheral shape which is a deformed shape which is not a circular shape, and the accommodation portion has an inner peripheral shape which is a shape that corresponds to the outer peripheral shape of the leading end portion, thereby preventing the leading end portion from rotating about an axis extending along a longitudinal direction, wherein the inner peripheral shape of the accommodation portion and the outer peripheral shape of the leading end portion of the sheathed thermocouple are each formed in any of a closed curve shape other than a circular shape, a semicircular shape, and a polygonal shape, and a shape obtained by combining a semicircle and a rectangle, and the inner peripheral shape of the accommodation portion and the outer peripheral shape of the leading end portion of the sheathed thermocouple are made to be the same with each other so as not to cause a gap between an inner peripheral face of the accommodation portion and an outer peripheral face of the leading end portion of the sheathed thermocouple and the accommodation portion and the leading end portion are fitted to each other, whereby the accommodation portion prevents the leading end portion of the sheathed thermocouple from rotating about the axis extending along the longitudinal direction.

7. The pad-equipped thermocouple according to claim 6, wherein the sheath side face of the leading end portion of the sheathed thermocouple has formed therein a hole portion for allowing the temperature measuring junction to be exposed therethrough, the hole portion is formed at a predetermined interval from an end face of the leading end, of the sheath, which has the sealing member welded thereto, the temperature measuring junction is formed as a weld portion obtained by welding leading ends of the pair of thermocouple elements to each other, and the hole portion is sealed by the weld portion.

8. A pad-equipped thermocouple comprising:

a sheathed thermocouple in which at least a pair of thermocouple elements and an insulating powder for holding the thermocouple elements are accommodated in a sheath, and an opening in a leading end of the sheath is sealed by a sealing member being welded to the leading end of the sheath; and a pad welded to a temperature measurement target object and configured to hold the sheathed thermocouple at a surface of the temperature measurement target object, wherein a temperature measuring junction formed by the pair of thermocouple elements is provided so as to be exposed at a sheath side face of a leading end portion of the sheathed thermocouple, the pad includes an accommodation portion configured to accommodate the leading end portion of the sheathed thermocouple such that the leading end portion can be inserted into and pulled out from the accommodation portion along the surface of the temperature measurement target object, the accommodation portion accommodates the leading end portion of the sheathed thermocouple in a state where the temperature measuring junction and the surface of the temperature measurement target object are in contact with each other, the leading end portion has an outer peripheral shape which is a deformed shape which is not a circular shape, and the accommodation portion has an inner peripheral shape which is a shape that corresponds to the outer peripheral shape of the leading end portion, thereby preventing the leading end portion from rotating about an axis extending along a longitudinal direction, wherein the sheath side face of the leading end portion of the sheathed thermocouple has formed therein a hole portion for allowing the temperature measuring junction to be exposed therethrough, the hole portion is formed at a predetermined interval from an end face of the leading end, of the sheath, which has the sealing member welded thereto, the temperature measuring junction is formed as a weld portion obtained by welding leading ends of the pair of thermocouple elements to each other, and the hole portion is sealed by the weld portion.

* * * * *